July 7, 1959 W. E. CHOPE ET AL 2,894,185
MEASURING AND RECALIBRATING SERVOSYSTEM
Filed Feb. 21, 1957
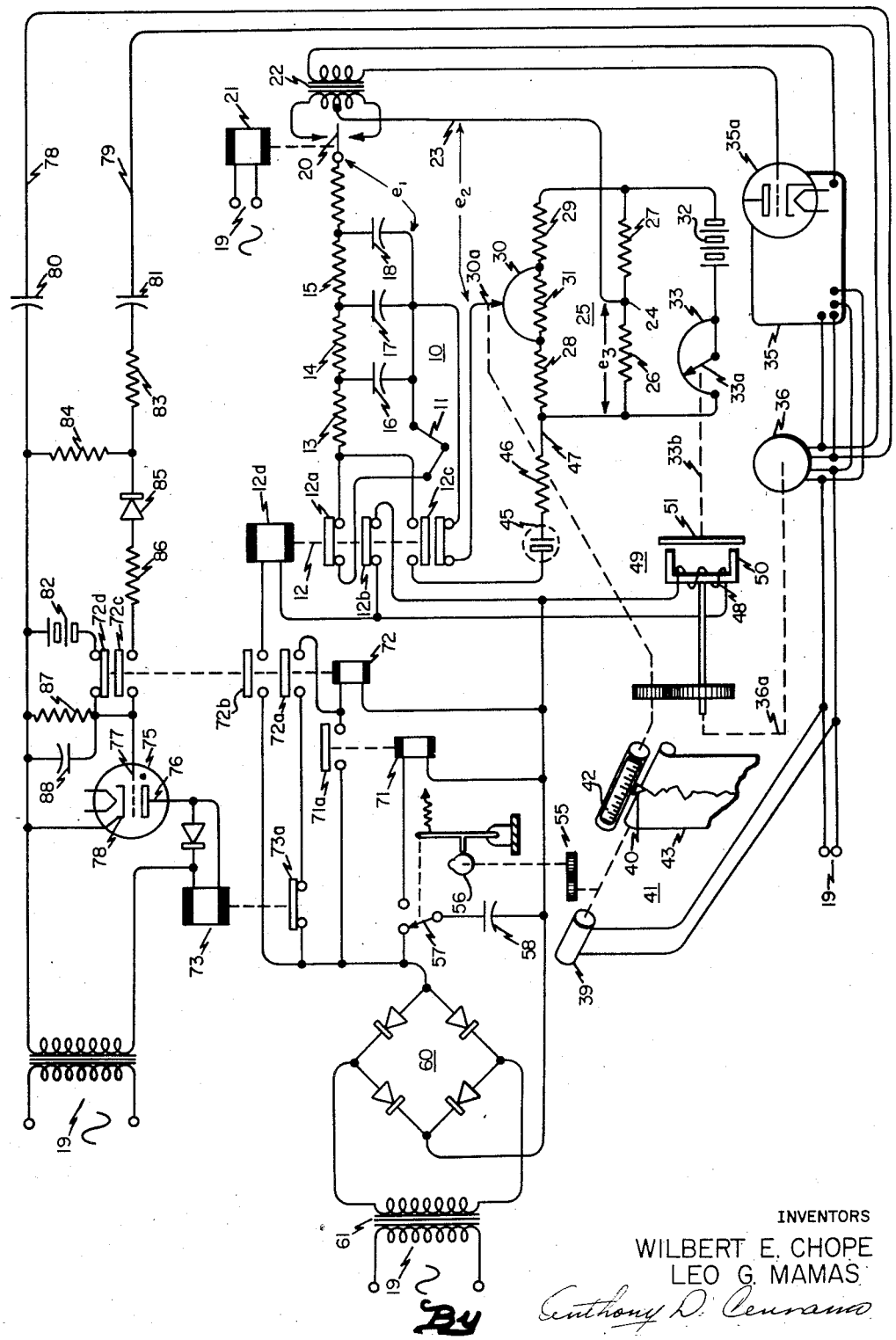
INVENTORS
WILBERT E. CHOPE
LEO G. MAMAS
By *Anthony D. Cenrano*

United States Patent Office 2,894,185
Patented July 7, 1959

2,894,185

MEASURING AND RECALIBRATING SERVOSYSTEM

Wilbert E. Chope and Leo G. Mamas, Columbus, Ohio, assignors to Industrial Nucleonics Corporation Application February 21, 1957, Serial No. 641,694

12 Claims. (Cl. 318—28)

This invention relates generally to a measuring system of the voltage balance type and particularly to an improved method and means of periodically calibrating or standardizing the system.

The present invention finds utility in a measuring system for continuously measuring an unknown quantity, and wherein there is provided a voltage to continuously balance to zero the voltage variations indicative of the unknown quantity. To calibrate the system against a standard there is provided a means for periodic calibration or standardization.

The standardization feature for the voltage balance network and the improvement of the present invention are particularly adaptable to a radiation type of measuring system for continuously measuring the quantity or quality, such as thickness, density or moisture, of a moving object. Such a system is disclosed in the co-pending application of Henry R. Chope, Serial No. 286,220 for "Standardization System." However, for purposes of simplicity, the present invention will be described in combination with, and as an improvement over the temperature measuring network of that disclosed in the patent to Charles E. Miller, No. 2,704,822.

In the standardization system disclosed in the aforesaid H. R. Chope application, standardization is initiated by a timer and terminated by a cam arrangement. In the Miller patent, although he initiates standardization by means of the same or a similar cam, standardization is terminated when a previously charged capacitor has had time to discharge to some arbitrary level, thus providing a fixed time delay sufficient to allow complete standardization to take place. The discharge of the capacitor always allows the same time interval, and in no way provides for variation of standardization time in proportion to the amount of correction required.

It can be appreciated that in systems for measuring fast traveling material, a considerable amount of material may pass unmeasured due to unnecessary delay in the standardizing time. On the other hand, in the event of a sudden circuit failure in certain parts of the instrument, or if a large accumulation of foreign material were to suddenly fall upon the detector the time allowed for a phase of standardization was not usually sufficient for complete recalibration. In such an event, the gauge might continue measuring inaccurately for a considerable length of time.

The present invention comprises circuitry that may be incorporated in the conventional standardization systems that interrupts the measuring operation for a period of time no longer or shorter than is necessary and which period of time is in proportion to the amount of correction required for complete standardization.

Accordingly it is a general object of the present invention to provide a new and improved means for standardizing a measuring system of the voltage balance type.

A further object of the present invention is to provide a system of standardization for a measuring system that does not interrupt the measuring operation any longer than is required.

Another object of the present invention is to provide a standardization operation of a sufficient time to effect complete standardization of the measuring system.

Another object of the present invention is to provide method and means for varying the standardization time of a measuring system in proportion to the amount of correction required.

Another object is to provide a standardization means that may be incorporated in a conventional voltage balance measuring system and that is simple in design and relatively inexpensive.

Further objects and attainments of the present invention will become apparent from the following detailed description when taken in conjunction with the single drawing that diagrammatically and schematically illustrates the preferred embodiment of the invention.

Referring now to the drawing, the invention in one form is shown applied to a measuring network such as that shown in the aforementioned Miller patent as a typical embodiment for the determination of an unknown voltage representative of the magnitude of a condition. In this embodiment the condition to be measuresd is temperature, and a thermocouple 11 is connected to the input circuit which includes contacts 12a of a relay 12. The input circuit has an R-C filter network including resistors 13, 14 and 15 and capacitors 16, 17, and 18 and a vibrator or converter 20 of the polarized type operable by a coil 21 energized from a suitable source 19 of alternating current. The input circuit further includes a transformer 22, with the stationary contacts of the converter 20 being connected to the ends of the primary winding while a conductor 23 is connected to a midtap thereof.

Conductor 23 extends to the midpoint 24 of a potentiometer network 25 comprising a pair of parallel impedance branches. One parallel branch includes a calibrating resistor 26 and a cold-junction compensating resistor 27 and the other parallel branch includes end coils or series resistors 28 and 29 connected in series with a slide wire 30 having a shunting resistor 31 connected across its opposite terminals. The potentiometer network 25 is energized from a battery 32 by way of a rheostat 33.

The potentiometer network 25 supplies a voltage $e_2$ opposite to the input voltage $e_1$. If $e_1$ be greater or less than the voltage $e_2$, it will be seen that the vibrator or converter 20 will convert the difference voltage to an alternating current which through the secondary windings of transformer 22 will be applied to an amplifier 35 for the control of the energization and direction of rotation of a balancing motor 36. Thus if the input $e_1$ exceeds the balancing voltage $e_2$ the balancing motor 36 will be energized for rotation in direction relatively to adjust slidewire 30 and its associated contact 30a in a direction to reduce the difference voltage or to increase $e_2$ until it is equal to $e_1$. The motor 36 adjusts $e_2$ so that it maintains it substantially equal to $e_1$ at all times and thus the position of a pen-index 40 of a recorder 41 continuously indicates on a scale 42 and records on a record chart 43 the magnitude of the condition under measurement, i.e., in this embodiment the temperature to which thermocouple 11 is subjected.

The filter network in the input circuit not only tends to eliminate stray 60 cycle alternating current from the input circuit but it also functions to introduce a velocity component to insure a damping action which prevents overshoot of the motor 36 as it relatively adjusts slidewire 30 and its contact 30a.

Any change in the voltage of battery 32 will of course change the current flow through the parallel paths including the resistors 26 and 27 in series circuit relation in one path; and including the resistors 28, 29 and the slidewire 30 with its shunting resistor 31 in series in the other path. Thus any change in current flowing through the upper parallel path will change the value of the voltage $e_2$ to the detriment of accuracy of measurement. Since changes in voltage of the battery 32 are relatively small and occur over substantial lengths of time it is only necessary to effect a standardizing operation at relatively infrequent intervals, for example, every fifteen minutes, or in some cases every hour or so.

The standardizing operation occurs as the result of the energization of the relay coil 12d which opens its contacts 12a, 12b and 12e and closes its contact 12c. The opening of contacts 12a disconnects the thermocouple 11 from the measuring circuit 10 and the closure of contact 12c connects into the measuring circuit 10 a standard cell 45 having in series therewith a resistor 46 having a much higher resistance than those in the potentiometer network 25. It can be appreciated that the standard cell 45 can be replaced by any other standard means dependent upon the application of the circuit. The voltage introduced into the measuring network by the standard cell 45 opposes the voltage $e_3$ developed across the standardizing resistor 26. If $e_3$ be less or greater than the voltage of the standard cell 45 the difference voltage is converted by the vibrator 20 to an alternating current voltage which after amplification is utilized for the energization of motor 36 for adjustment of rheostat contact 33a in a direction to bring $e_3$ to a value equal to the voltage of standard cell 45. To adjust rheostat contact 33a, a coil 48 of a magnetic clutch 49 is energized to complete a driving engagement between driving member 50 and a driven member 51 which is mechanically connected as shown by the broken line 33b to the movable contact 33a. It may here be observed that the contact 33a may be and preferably is concurrently adjusted with contact 30a. Movement of contact 30a does not affect the balancing of the voltage $e_3$ against that of the standard cell 45 but it is helpful in introducing an additional damping component for high speed standardizing operations.

The coils 12d and 48 are energized under the control of a suitable timing device, which may employ the constant speed motor 39 also used to actuate the chart roll 43. For example, the motor 39 may be coupled as shown to reduction gears 55 driving a timing cam 56 which periodically operates a single-pole double-throw switch 57 from its left-hand position to its right-hand position.

Standardization is initiated when the cam 56 operates switch 57 to the right-hand position. The discharge of capacitor 58 now energizes relay 71. However, in this case the value of 58 is such that 71 closes only very momentarily; whereupon the current flow decreases below the hold-in value and contact 71a opens again almost immediately. Relay 71 cannot be operated again until the cam 56 has allowed switch 57 to return to its original position to allow recharging of capacitor 58.

The momentary closure of contacts 71a, however, has energized relay 72, whose contacts 72a establish a holding circuit through its coil 72. Relay 72 will now remain energized (regardless of the immediate reopening of contacts 71a) until its coil circuit is broken by contacts 73a of the plate circuit relay 73.

Contacts 72b have now completed a circuit through the coils of the relay 12d and the clutch 48 to standardize the system in the manner described above. However, instead of maintaining the standardizing operation for a fixed, precalculated interval of time, standardization will continue only until the null point is reached; that is, it must continue until $e_3$ is equal to the voltage of the standard cell 45, but when these voltages have been equalized standardization terminates immediately. This is the basic principle of the standardization system of the present invention.

The circuit utilizing the thyratron 75 is the means of determining when the null point has been reached. During standardization, if the voltage $e_3$ is not equal to that of the standard cell 45, the difference voltage is converted by the vibrator 20 to an alternating current voltage. This A.C. voltage is amplified by the servo amplifier 35 to drive the servo motor 36, which through the clutch coupling adjusts rheostat 33 in a direction so as to equalize $e_3$ to the value of standard cell 45. When the voltages have been equalized, there is no A.C. input to the amplifier, the A.C. output to the servo motor approaches zero, and the motor will stop at the balance point.

The purpose of the thyratron 75 circuit is to monitor the presence or absence of A.C. voltage at the output of the servo amplifier during standardization and to switch the system from standardizing back to measuring condition as soon as the A.C. signal ceases. Accordingly, this signal is made available to the grid 77 circuit of the thyratron 75 through lines 78 and 79 and capacitors 80 and 81.

When the system is measuring and relay 72 is de-energized, a negative potential from source 82 is maintained on the grid 77 of tube 75 to keep this tube from firing. When standardizing, contacts 72d disconnect this source of bias voltage and supply an alternate bias through contacts 72c. The A.C. voltage from the output of the servo amplifier 36, through capacitors 80 and 81, appears across resistors 83 and 84. The portion of this signal which appears across 84 is rectified by selenium rectifier 85 to supply the negative bias to the grid 17 of tube 75. Thus tube 75 is prevented from firing until standardization is complete. However, when rheostat 33 has been driven to the null point and $e_3$ is equal to the voltage of the standard cell 45, the A.C. signal which drives the servo motor 36 will approach zero, as will the A.C. voltage across 83 and 84. Capacitor 88 will now quickly discharge through resistor 87 until the voltage at the grid 77 of tube 75 drops below the firing point of this tube. When tube 75 conducts current, relay 73 is energized and its contacts 73a open. Relay 72 will now be de-energized, restoring the system to measuring condition and resetting the standardization circuits. A number of seconds or minutes will elapse before cam 56 can rotate sufficiently to allow switch 57 to go back to the left hand position and recharge capacitor 58. At this time another standardization period can be initiated by further action of the cam 56.

Although only certain and specific embodiments of the present invention are shown, it is to be expressly understood that many modifications are possible thereof without departing from the true spirit of this invention.

What is claimed is:

1. A standardizing circuit for a measuring system having a balancing voltage in opposition to the voltage derived from its measuring operation comprising: means for periodically interrupting the measuring operation of said system, a reference voltage, means for connecting said balancing voltage in opposition to said reference voltage when said measuring operation is interrupted, and circuit means responsive to any difference between said reference voltage and said balancing voltage for holding said last named connection and for interrupting the same and returning said system to its measuring operation when said balancing voltage is of a value equal to said reference voltage.

2. A standardizing circuit for a measuring system having a balancing voltage in opposition to the voltage derived from its measuring operation comprising: means for periodically interrupting the measuring operation of said system, a reference voltage, circuit means connecting said balancing voltage in opposition to said reference voltage during said periodic interruptions, driving means energized by the difference voltage between said balancing voltage and said reference voltage, means connecting said driving means to said circuit means to restore the value of said balancing voltage to that of said reference voltage, and means also connected to said driving means for disconnecting said circuit means and returning said system to its measuring operation when said balancing voltage is of a value equal to said reference voltage.

3. A standardizing circuit for a measuring system having a balancing voltage in opposition to the voltage derived from its measuring operation comprising: means for periodically interrupting the measuring operation of said system, a reference voltage, circuit means connecting said balancing voltage in opposition to said reference voltage during said periodic interruptions, driving means energized by the difference voltage between said balancing voltage and said reference voltage, means connecting said driving means to said circuit means to restore the value of said balancing voltage to that of said reference voltage, switching means having a thermionic tube including a control electrode, means also connecting said driving means to said control electrode to maintain said switching means inoperative when there is a difference voltage between said balancing and reference voltages and means actuated by said switching means to disconnect said circuit means and return said system to its measuring operation when said balancing voltage is of a value equal to said reference voltage.

4. A standardizing circuit for a measuring system having a balancing voltage in opposition to the voltage derived from its measuring operation comprising: relay means, means for actuating said relay means to periodically interrupt the measuring operation of said system, a reference voltage, circuit means operatively connected to said relay for comparing said balancing voltage with said reference voltage during said periodic interruptions, driving means energized by the difference voltage between said balancing voltage and said reference voltage, means connecting said driving means to said circuit means to restore the value of said balancing voltage to that of said reference voltage, switching means having connected thereto said driving means to reactuate said relay when said difference voltage is zero and to thereby disconnect said circuit means and return said system from its standardizing operation back to its measuring operation.

5. A standardizing circuit for a measuring system having a balancing voltage in opposition to the voltage derived from its measuring operation comprising: relay means, means for actuating said relay means to periodically interrupt the measuring operation of said system, a reference voltage, circuit means operatively connected to said relay for comparing said balancing voltage with said reference voltage during said periodic interruptions, driving means energized by the difference voltage between said balancing voltage and said reference voltage, means connecting said driving means to said circuit means to restore the value of said balancing voltage to that of said reference voltage, switching means connected to said relay having at least one thermionic tube including a control electrode, means also connecting said driving means to said control electrode to maintain said switching means inoperative when there is a said difference voltage and to reactuate said relay when said balancing voltage is of a value equal to said standard reference voltage to thereby disconnect said circuit means and return said system from its standardizing operation back to its measuring operation.

6. A standardizing circuit for a measuring system having a balancing voltage in opposition to the voltage derived from its measuring operation comprising: relay means, a timing circuit for periodically actuating said relay to periodically interrupt the measuring operation of said system, reference voltage, circuit means operatively connected to said relay for comparing said balancing voltage with said reference voltage during said periodic interruptions, driving means energized by the difference voltage between said balancing voltage and said reference voltage, means connecting said driving means to said circuit means to restore the value of said balancing voltage to that of said reference voltage, switching means connected to said relay, bias means to maintain said switch inoperative during said measuring operation, said relay when periodically actuated by said timing circuit also operative to disconnect said biasing means and connect said driving means to said switch, said driving means reactuating said relay when sid difference voltage is zero, to thereby disconnect said circuit means and restore said system to its measuring operation.

7. A standardizing circuit for a measuring system having a balancing voltage in opposition to the voltage derived from its measuring operation comprising: relay means, a timing circuit for periodically actuating said relay to periodically interrupt the measuring operation of said system, a reference voltage, circuit means operatively connected to said relay for comparing said balancing voltage with said reference voltage during said periodic interruptions, driving means energized by the difference voltage between said balancing voltage and said reference voltage, means connecting said driving means to said circuit means to restore the value of said balancing voltage to that of said reference voltage; switching means having at least one thermionic tube including a control electrode, biasing means connected to said control electrode to maintain said tube non-conducting during said measuring operation, said relay when periodically actuated by said timing circuit also operative to disconnect said biasing means and connect said driving means to said control electrode to maintain said tube non-conducting, said tube reactuating said relay when said difference voltage is zero to thereby disconnect said circuit means and restore said system to its measuring operation.

8. A standardizing circuit for a measuring system having a balancing voltage in opposition to the voltage derived from its measuring operation comprising: relay means, a timing circuit for periodically actuating said relay to periodically interrupt the measuring operation of said system, a reference voltage, circuit means operatively connected to said relay for comparing said balancing voltage with said reference voltage during said periodic interruptions, driving means energized by the difference voltage between said balancing voltage and said reference voltage, means connecting said driving means to said circuit means to restore the value of said balancing voltage to that of said reference voltage; switching means having at least one thermionic tube including an anode, cathode and control electrode, means connecting said relay to said anode, biasing means connected to said cathode to maintain said tube non-conducting during said measuring operation, said relay when periodically actuated by said timing circuit operative to disconnect said biasing means and connect said driving means to said control electrode to maintain said tube non-conducting, said tube reactuating said relay when said voltage difference is zero to thereby disconnect said circuit means and restore said system to its measuring operation.

9. In a measuring system having means for interrupting the measuring operation thereof and an automatic standardizing device including means operative during said interruption for comparing the value of a first signal utilized in said measuring operation with the value of a reference signal and automatic means actuated by any difference between said first signal and said reference signal for readjusting the value of said first signal so as to decrease said difference, the improvement of means for automatically determining the time period allowed for said interruption so that the same will be no greater and no less than the time required for said readjusting means to reduce said difference substantially to zero, which comprises holding means energized by said difference for maintaining said interruption, and means for discontinuing said interruption and readjustment and restoring said system to its measuring operation when said difference approaches zero.

10. The combination of claim 9 wherein said holding means comprises switch means having a first alternative state for maintaining said interruption and a second alternative state making connections for said measuring operation, an electronic amplifier having an input receiving said signal difference, and means responsive to the presence of an output signal from said amplifier for actuating said switch means.

11. The combination of claim 9 wherein said readjusting means comprises a mechanically adjustable element and servomechanism means including drive means for driving said adjustable element, and wherein said holding means comprises means responsive to the power output of said drive means for maintaining said interruption.

12. The combination of claim 9 wherein said readjusting means comprises a mechanically adjustable element, motor means for driving said adjustable element, a servo-amplifier responsive to said signal difference for providing a power output to said motor whenever said difference is not zero, and relay means energized by said power output for maintaining said interruption and deenergized by a substantial reduction in said power output for restoring said system to measuring operation.

References Cited in the file of this patent

UNITED STATES PATENTS

| | | |
|---|---|---|
| 2,483,364 | Ehret | Sept. 27, 1949 |
| 2,610,311 | Phillips | Sept. 9, 1952 |
| 2,704,822 | Miller | Mar. 22, 1955 |